US012209609B2

(12) United States Patent
Nortrup

(10) Patent No.: US 12,209,609 B2
(45) Date of Patent: Jan. 28, 2025

(54) TORQUE TRANSMITTING BALL JOINT

(71) Applicant: Tennant Company, Eden Prairie, MN (US)

(72) Inventor: Eric Sam Nortrup, Golden Valley, MN (US)

(73) Assignee: TENNANT COMPANY, Eden Prairie, MN (US)

( * ) Notice: Subject to any disclaimer, the term of this patent is extended or adjusted under 35 U.S.C. 154(b) by 334 days.

(21) Appl. No.: 17/842,724

(22) Filed: Jun. 16, 2022

(65) Prior Publication Data
US 2022/0412399 A1 Dec. 29, 2022

Related U.S. Application Data

(60) Provisional application No. 63/215,427, filed on Jun. 26, 2021.

(51) Int. Cl.
*F16C 11/06* (2006.01)
(52) U.S. Cl.
CPC ...... *F16C 11/0623* (2013.01); *F16C 11/0609* (2013.01); *F16C 11/069* (2013.01)
(58) Field of Classification Search
CPC .................................. A47L 11/26; A47L 11/40
See application file for complete search history.

(56) References Cited

U.S. PATENT DOCUMENTS 2,854,829 A * 10/1958 Porter ...................... F16D 3/16
403/135
3,098,365 A * 7/1963 Pearson ................ F16D 3/2052
464/120
3,107,505 A * 10/1963 Koss ....................... F16D 3/221
464/141
3,778,860 A 12/1973 Thielen
4,114,401 A * 9/1978 Van Hoose ........... F16D 3/2052
81/177.75
5,816,926 A * 10/1998 Lynch ....................... F16D 3/30
464/118

(Continued)

FOREIGN PATENT DOCUMENTS

DE 102016208895 A1 11/2017
DE 1020182513565 A1 2/2020

(Continued)

OTHER PUBLICATIONS

International Search Report and Written Opinion of the International Application No. PCT/US2022/033895, mailed Oct. 11, 2022, 25 pg.

*Primary Examiner* — Daniel J Wiley
(74) *Attorney, Agent, or Firm* — Fredrikson & Byron, P.A.

(57) ABSTRACT

A torque transmitting ball joint can include a spherical ball, a stem extending from the spherical ball, one or more pins coupled to the spherical ball, and a socket. The socket can define an opening sized to contain the spherical ball within the socket and one or more slots sized to accommodate a pin of the one or more pins. The one or more pins can be contained by the one or more slots and can translate within the slot as the spherical ball rotates relative to the socket about a pivot center. At least one of the one or more pins can abut a sidewall of its slot and transmit torque from the stem to the socket via the spherical ball when the stem and spherical ball rotates relative to the socket.

20 Claims, 12 Drawing Sheets

(56) References Cited

U.S. PATENT DOCUMENTS

| | | | |
|---|---|---|---|
| 6,244,966 B1* | 6/2001 | Ofenhitzer | F16D 1/101 |
| | | | 464/112 |
| 6,783,600 B2 | 8/2004 | Tawara et al. | |
| 7,552,499 B2 | 6/2009 | James et al. | |
| 8,161,595 B1 | 4/2012 | Wilson | |
| 8,286,302 B2 | 10/2012 | Andrup et al. | |
| 8,887,348 B2 | 11/2014 | Kenter et al. | |
| D750,856 S | 3/2016 | De Smedt | |
| 9,420,930 B2 | 8/2016 | Ritscher et al. | |
| 9,554,680 B2 | 1/2017 | Elsdon et al. | |
| 9,826,874 B2 | 11/2017 | Franke et al. | |
| 9,999,333 B2 | 6/2018 | Thorne et al. | |
| D825,120 S | 8/2018 | Daniels et al. | |
| 10,130,230 B2 | 11/2018 | Moser et al. | |
| 10,327,609 B2 | 6/2019 | Conrad | |
| D856,614 S | 8/2019 | Daniels et al. | |
| 10,780,570 B2 | 9/2020 | Franke | |
| 2007/0042826 A1* | 2/2007 | Furusawa | F16D 3/2052 |
| | | | 464/120 |
| 2010/0029394 A1* | 2/2010 | Arden | F16D 3/2052 |
| | | | 403/345 |
| 2011/0030517 A1 | 2/2011 | Peng | |
| 2012/0321374 A1* | 12/2012 | Ray | F16C 11/0609 |
| | | | 403/111 |
| 2014/0309044 A1* | 10/2014 | Yao | F16D 3/2052 |
| | | | 464/120 |
| 2020/0205635 A1 | 7/2020 | Ding et al. | |
| 2020/0248740 A1* | 8/2020 | Tsai | B25B 23/0014 |

FOREIGN PATENT DOCUMENTS

| | | |
|---|---|---|
| EP | 3569128 A3 | 12/2019 |
| EP | 3597093 A1 | 1/2020 |
| KR | 101983747 B1 | 5/2019 |
| WO | 2019145987 A1 | 8/2019 |
| WO | 2019207289 A1 | 10/2019 |
| WO | 2019219580 A1 | 11/2019 |
| WO | 2019219582 A1 | 11/2019 |
| WO | 2020115780 A1 | 6/2020 |
| WO | 2020212188 A1 | 10/2020 |

* cited by examiner

TORQUE TRANSMITTING BALL JOINT

CROSS REFERENCE TO RELATED APPLICATION

This application claims the benefit of U.S. Provisional Application No. 63/215,427, filed Jun. 26, 2021, the content of which is hereby incorporated by reference in its entirety.

TECHNICAL FIELD

This disclosure relates to mechanical joints, particularly for surface maintenance machines.

BACKGROUND

Floor cleaning in public, commercial, institutional, and industrial buildings has led to the development of various specialized floor cleaning machines, such as hard and soft floor cleaning machines. Representative hard floor surfaces include tile, concrete, laminate (e.g., Formica®), natural and artificial wood, and the like. A representative soft floor surface is carpet. These cleaning machines generally utilize a cleaning head that includes one or more cleaning tools configured to perform the desired cleaning operation.

Different types of floor cleaning machines are used to perform various cleaning operations on floor surfaces. For example, floor cleaning machines can be large push behind machines which perform wet floor treatment, including scrubbing, of a hard floor surface. However, large floor cleaning machines, such as push behind machines, may be difficult to manipulate and may be limited in their ability to clean certain spaces.

More recently, upright floor cleaning machines, which can be hand guided, have been used to perform various cleaning operations on floor surfaces. While the upright floor cleaning machines may be more maneuverable than large, push behind machines, an operator may still have trouble guiding them around obstacles and manipulating them in areas which are difficult to access. Further, upright floor cleaning machines may use brushes to clean floor surfaces and the brushes may be configured to spin in one direction. While having benefits such as simplicity and increased power, these configurations may be limited in their mobility. For example, hand guided floor vacuums often limit an operator to pulling or pushing the vacuum in the desired direction and do not allow an operator to easily turn.

SUMMARY

In one aspect, this disclosure is directed to a torque transmitting ball joint which facilitates rotational movement, such as for a floor maintenance machine. The torque transmitting ball joint comprises a spherical ball and a stem extending from the spherical ball. The torque transmitting ball joint also comprises one or more pins coupled to the spherical ball and a socket comprising an opening sized to contain the spherical ball within the socket. The socket also comprises one or more slots which are sized to accommodate a respective pin of the one or more pins coupled to the spherical ball. At least one of the one or more pins are contained within a respective slot and can translate relative to the respective slot as the stem and spherical ball rotate relative to the socket about a pivot center. The at least one of the one or more pins can abut a sidewall of the respective slot, transmitting torque from the stem and the spherical ball to the socket when the stem and the spherical ball rotate relative to the socket.

In another aspect of this disclosure, a torque transmitting ball joint comprises a spherical ball, a stem coupled to the spherical ball, a pin coupled to the spherical ball, and a socket sized to retain the spherical ball. The socket comprises an opening with the stem and a portion of the spherical ball extending outside of the socket. The socket also comprises a slot sized to accommodate the pin with the pin being contained within the slot and sliding relative to the slot as the stem and the spherical ball rotate relative to the socket about a pivot center. The pin can abut a sidewall of the respective slot and transmit torque from the stem and the spherical ball to the socket when the stem and the spherical ball rotate relative to the socket.

In another aspect of this disclosure, a torque transmitting ball joint comprises a spherical ball comprising two or more detents with the two or more detents sized to contain two or more bearings. The torque transmitting ball joint also comprises a stem extending from the spherical ball and a socket. The socket comprises an opening sized to contain the spherical ball within the socket and one or more channels sized to contain the two or more bearings within the socket. The two or more bearings can translate relative to the one or more channels as the stem and the spherical ball rotate relative to the socket about a pivot center. The two or more bearings can abut a sidewall of the one or more channels and transmit torque from the stem and the spherical ball to the socket when the stem and spherical ball rotate relative to the socket.

The details of one or more examples are set forth in the accompanying drawings and the description below. Other features, objects, and advantages will be apparent from the description and drawings, and from the claims or the numbered embodiments.

DETAILED DESCRIPTION

The following detailed description is exemplary in nature and is not intended to limit the scope, applicability, or configuration of the invention in any way. Rather, the following description provides some practical illustrations for implementing embodiments of the present invention. Examples of constructions, materials, and/or dimensions are provided for selected elements. Those skilled in the art will recognize that many of the noted examples have a variety of suitable alternatives.

Figure 1:
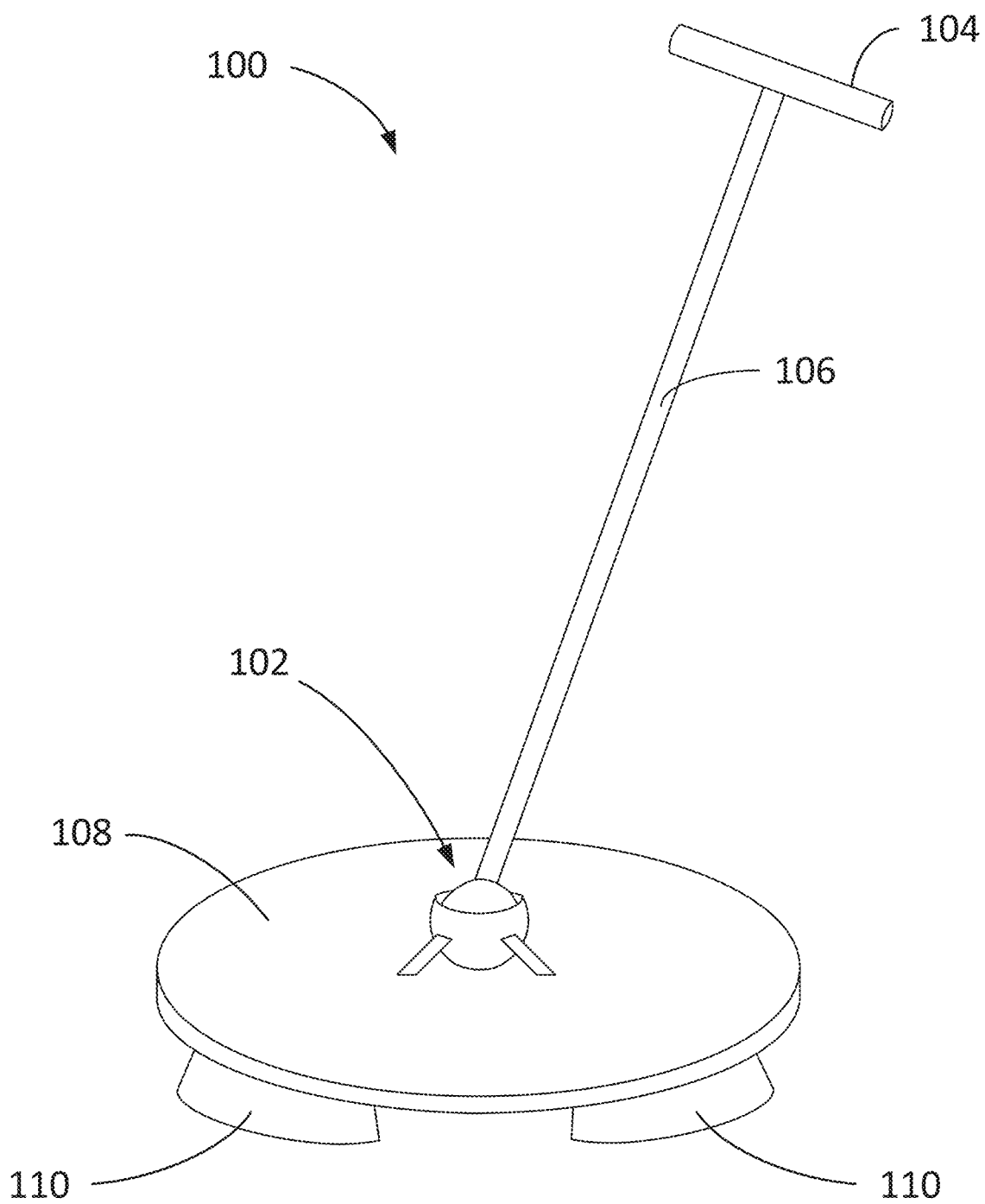
FIG. 1 is a perspective view of an example hand guided surface maintenance machine with a torque transmitting ball joint according to an aspect of the present disclosure.

FIG. 1 is a perspective view of an example hand guided surface maintenance machine 100 with a torque transmitting ball joint 102 according to an aspect of the present disclosure. The hand guided surface maintenance machine (also referred to as surface maintenance machine) includes a handle 104 and a stem 106 which are connected to a base 108 via the torque transmitting ball joint 102. The torque transmitting ball joint 102 can enable the handle 104 and stem 106 to rotate 360 degrees about the base 108. However, compared to a simple ball joint, the torque transmitting ball joint 102 can also enable the base 108 to rotate when the handle 104 is rotated. Torque from the rotation of the handle is transmitted through the stem 106 and the torque transmitting ball joint 102 to the base 108 which can cause the base 108 to rotate about its central axis. With the torque transmitting ball joint 102, an operator can easily turn and rotate the surface maintenance machine 100 by twisting the handle 104, thereby providing greater maneuverability.

Continuing with FIG. 1, the surface maintenance machine 100 also includes a one or more surface maintenance tools 110 which can perform surface maintenance operations on a floor surface. In FIG. 1, the surface maintenance tools 110 are brushes, but other types of surface maintenance tools can be used. For example, the surface maintenance machine 100 can use scrub brushes, sweeping brushes, polishing, stripping or burnishing pads, and tools for extracting (e.g., dry or wet vacuum tools). While not illustrated, the surface maintenance machine 100 can include components which are used in conjunction with the surface maintenance tools 110 to perform corresponding surface maintenance operations. For example, in some embodiments, the surface maintenance machine 100 can be used as a scrubbing, wet-vacuum and can include fluid reservoirs, fluid recovery tanks, fluid pumps, vacuum squeegees, motors for vacuums and for the surface maintenance tools, controls, and power sources. Other components are contemplated and a person having ordinary skill in the art will appreciate that FIG. 1 is just one example of a surface maintenance machine that includes a torque transmitting ball joint.

In FIG. 1, the socket of the torque transmitting ball joint 102 is shown as being secured to the base 108, but in some examples, the socket of the torque transmitting ball joint is secured to a stem and/or handle. In some such examples, the stem can be connected to a base (e.g., 110) of a hand-guided surface treatment device. The torque transmitting ball joint can transmit torque between two objects (e.g., stem 106 and base 108) regardless of which part of the joint each object is attached to. While the stem is described herein as transmitting torque to the socket of the torque transmitting ball joint, a person having ordinary skill will appreciate that the socket can transmit torque to the stem.

Figure 2:
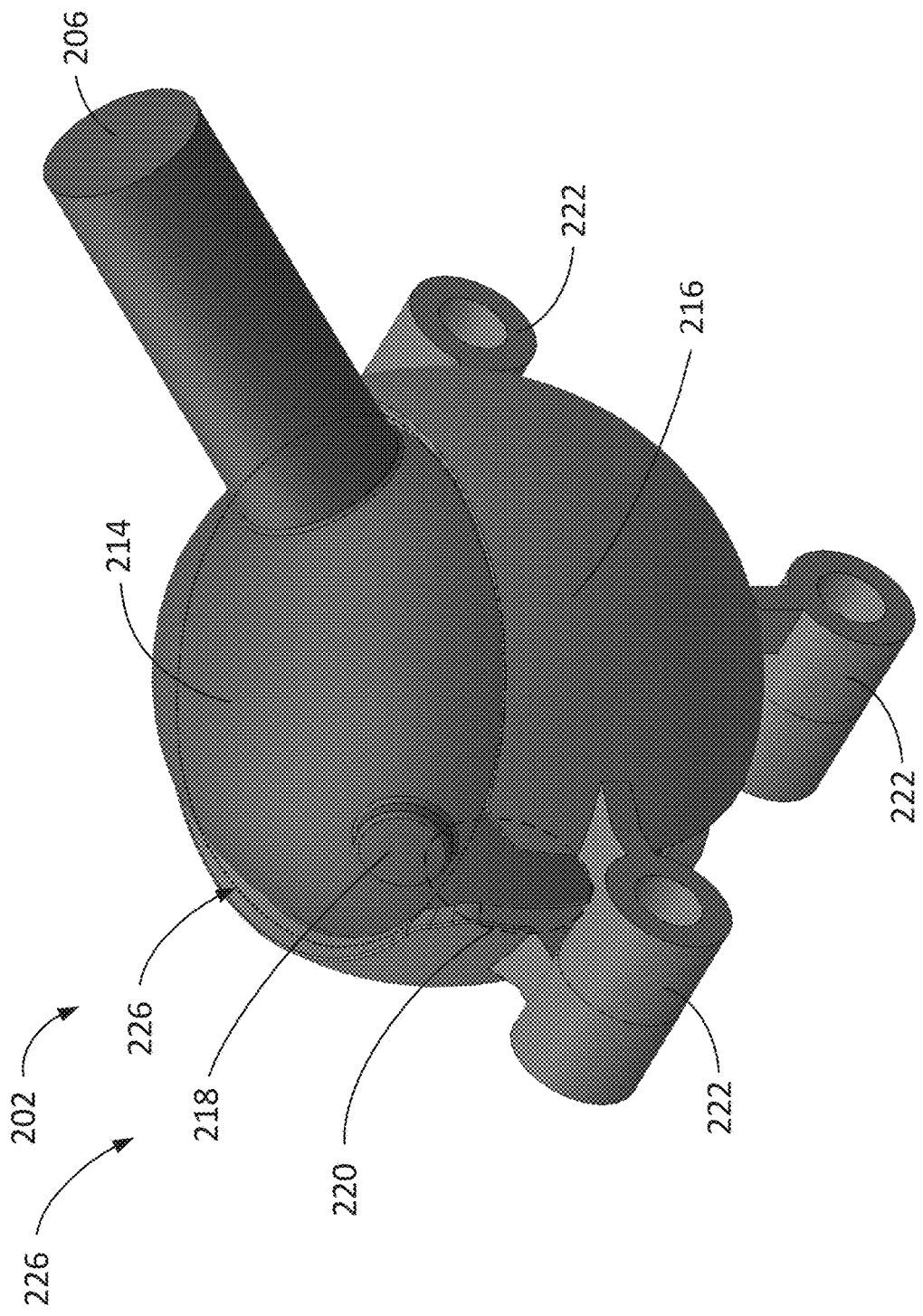
FIG. 2 is a perspective view of an example torque transmitting ball joint according to an aspect of the present disclosure.

Moving to FIG. 2, FIG. 2 is a perspective view of an example torque transmitting ball joint 202 according to an aspect of the present disclosure. The torque transmitting ball joint 202 includes a spherical ball 214, and a socket 216 which can retain the spherical ball 214. The spherical ball 214 is connected to a stem 206, which extends away from the spherical ball, and to one or more pins 218. In some embodiments, the one or more pins are integral to the spherical ball. The socket 216 of the torque transmitting ball joint 202 also includes one or more slots 220 sized to accommodate a respective pin of the one or more pins. In the illustrated embodiment of FIG. 2, the socket 216 can be made from two halves which can be joined together by joints 222. In some embodiments, the joints 222 can also secure the socket 216 to an object such as in FIG. 1 where the socket is secured to the base 108.

As illustrated in the embodiment of FIG. 2, the socket 216 of the torque transmitting ball joint 202 is configured to retain the spherical ball 214. However, the socket 216 does not completely contain the spherical ball 214, but rather encloses a portion of the spherical ball 214. The socket 216 includes an opening 226 that permits the stem 206, which is connected to the ball, and the portion of the spherical ball 214 not enclosed by the socket to protrude from the socket 216. In order to retain the ball, the socket is configured to enclose more than half of the ball such that the diameter of the ball is larger than the diameter of the opening 226 of the socket. Because the ball and socket can be made from materials which are not easily deformable, the ball, having a larger diameter than the opening of the socket, can be retained within the socket. Additionally, the socket 216 can have a slightly larger diameter than the spherical ball 214 which it receives. This configuration can reduce friction between the ball and the socket when the ball is retained within the socket and can enable the ball to move within the socket, for example, by spinning or rotating.

Together, the ball and the socket create a joint which allows the ball to rotate within the socket. The movement of the ball within the socket, though, is limited by the stem 206 connected to the ball and by the extents of the socket. In FIG. 2, for example, the stem 206 is at a point in which it can no longer move downward toward the socket without striking an edge of the socket. The edge of the socket generally continues around the socket in a circular manner but is disrupted by one or more slots 220 which are described elsewhere herein. The edge of the socket prevents the stem from moving past a certain point at which the stem abuts the edge of the socket. The stem can, however, move and rotate in all directions up to the point at which the stem abuts the edge of the socket. In the example of FIG. 2, the stem can rotate 360 degrees in the horizontal plane.

Figure 3:
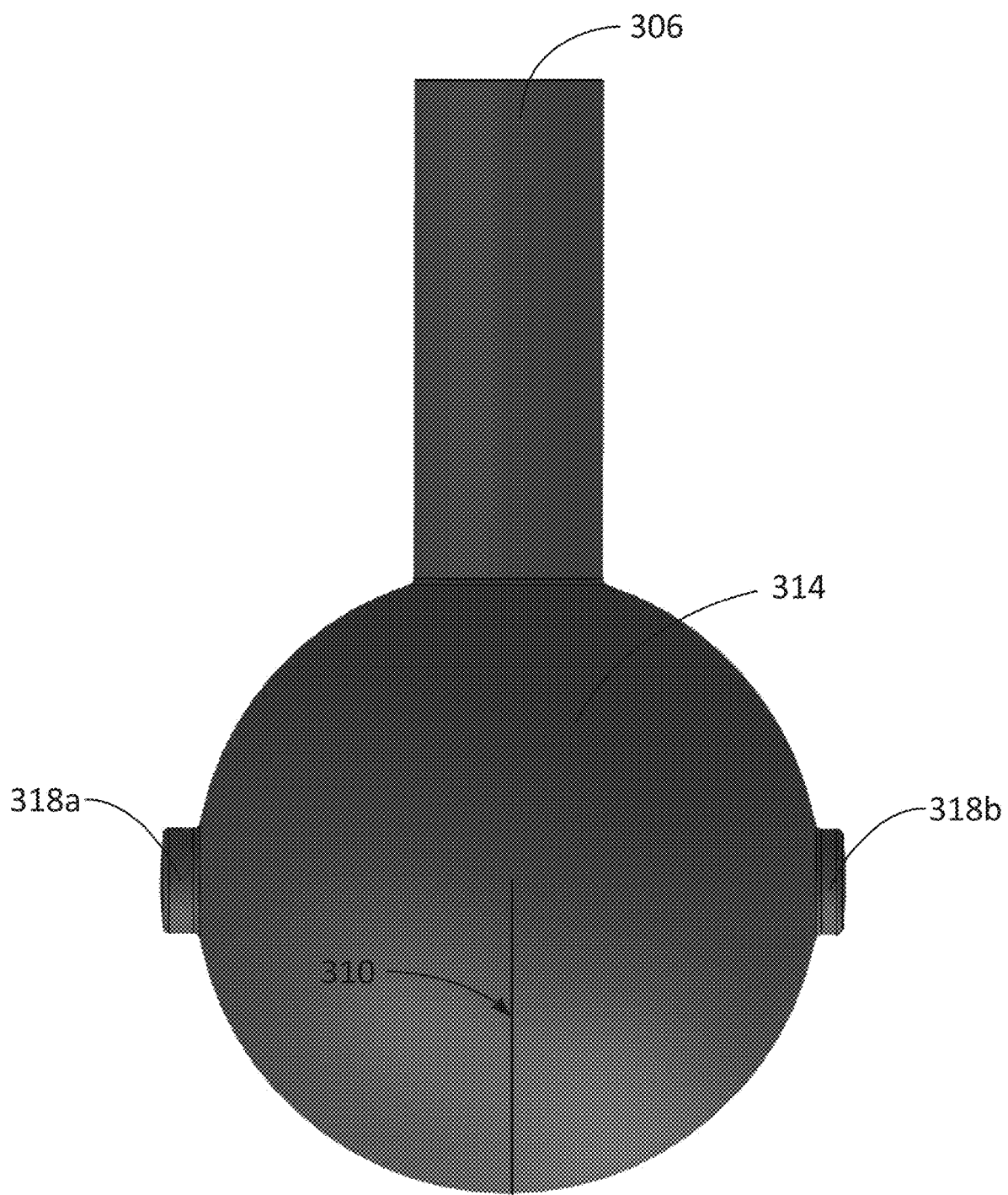
FIG. 3 is a side view of an example spherical ball of a torque transmitting ball joint according to an aspect of the present disclosure.

Moving to FIG. 3, FIG. 3 is a side view of an example spherical ball 314 of a torque transmitting ball joint according to an aspect of the present disclosure. The spherical ball can have a radius of curvature 310. The spherical ball 314 is connected to a stem 306 and to two pins 318a, 318b. The stem 306 extends outward from the spherical ball 314 and can extend for any length. In FIG. 3, the stem is a cylinder, however, the stem can have different shapes such as a cuboid. While the stem can have any width, in FIG. 3, the stem 306 has a smaller width than the diameter of the ball. The width of the stem relative to the diameter of the ball can, in some examples, determine how much the stem can move relative to the socket that receives the ball. For example, a thinner stem can allow for a larger range of motion. In contrast, a wider stem can have less range of motion but can be stronger than a thinner stem. The stem 306 can be connected to the spherical ball 314 by any means. In some examples, an end of the stem is threaded and attaches to the spherical ball via a hole in the ball which is threaded to receive the end of the stem. In some such examples, the stem 306 can be removed from the ball. In some examples, the stem is formed with the spherical ball and is integral with the spherical ball. Forming the stem with the spherical ball can be stronger than other connection methods which can reduce the likelihood of breakage between the spherical ball and stem.

Continuing with FIG. 3, the pins 318*a*, 318*b* are connected to and extend outward from the spherical ball 314. The pins can be connected to the spherical ball by any means, but in some examples, the pins are integral and are formed with the spherical ball. In the illustrated example, the pins 318*a*, 318*b* are on exact opposite sides of the spherical ball, 180 degrees apart. However, in some examples, the pins are located at different angles relative to each other. The pins 318*a*, 318*b* can extend any distance from the sphere. In some embodiments, the pins extend outward from the sphere a distance which enables them to engage edges of the one or more slots of the socket (e.g., socket 216). The pins can be the same size as each other as in FIG. 3, or the pins can be different sizes. In some examples, the pins are sized to engage the edges of the one or more slots of the socket and to avoid breaking off from the spherical ball. Smaller sized pins can enable a greater degree of freedom of the spherical ball when it is the socket, but larger pins can more easily resist breakage. In some examples, only one pin is connected to the spherical ball. The pins 318*a*, 318*b* are cylindrical but can take other shapes. Cylindrical pins can be advantageous over other shapes of pins as their sides do not have edges which can enable smooth motion when the ball is in the socket as is described elsewhere herein.

Figure 4:
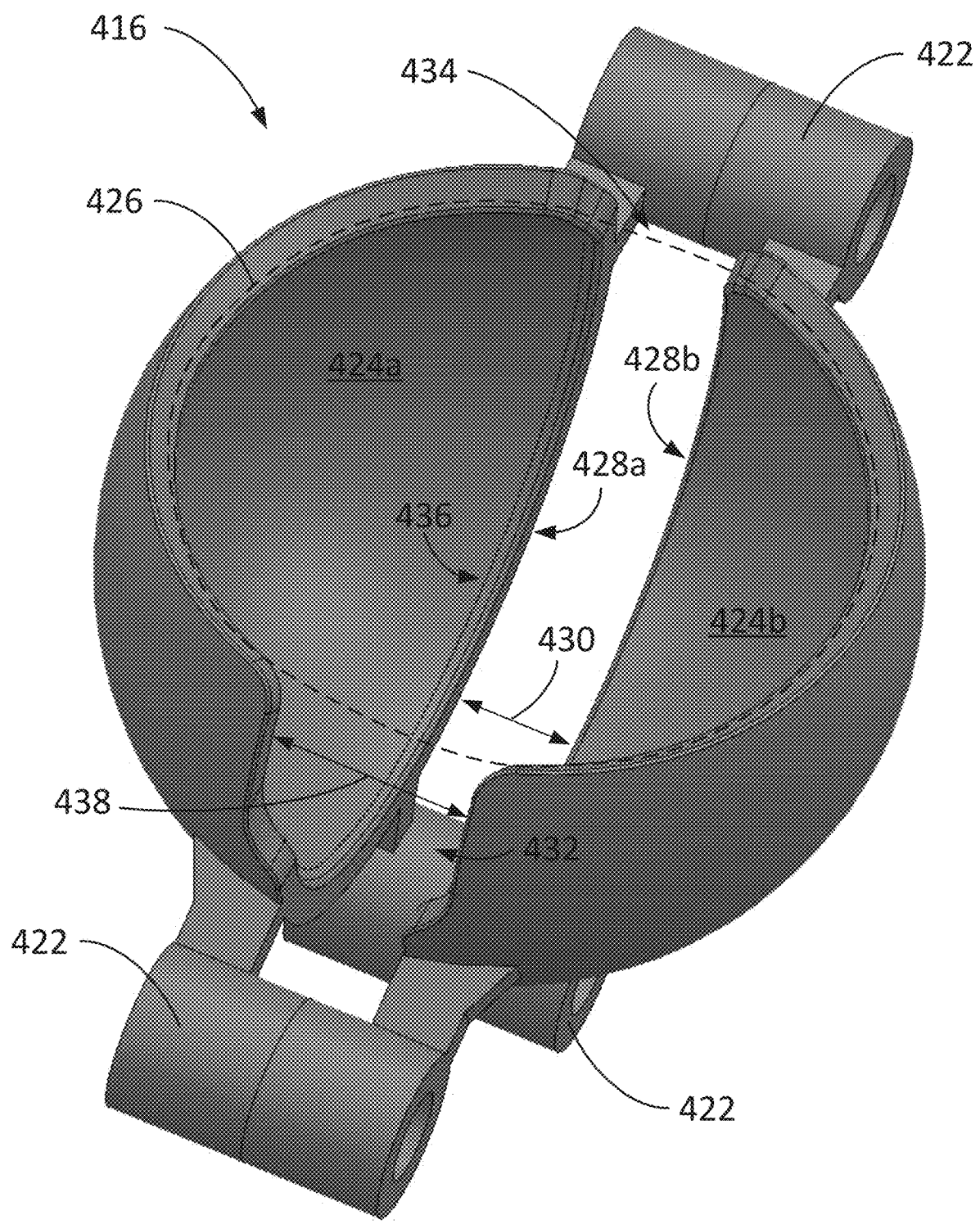
FIG. 4 is a perspective view of an example socket of a torque transmitting ball joint according to an aspect of the present disclosure.

Moving to FIG. 4, FIG. 4 is a perspective view of an example socket of a torque transmitting ball joint according to an aspect of the present disclosure. The socket 416 can comprise two or more shells 424*a*, 424*b* which are coupled to each other via joints 422. The socket 416 includes an opening 426 which is defined by the two or more shells 424*a*, 424*b* and is sized to retain a spherical ball (e.g., 314) within the socket 416. In some such examples, the two or more shells 424*a*, 424*b* can be diametrically opposed about the spherical ball. The socket 416 further includes one or more slots sized to accommodate one or more pins (e.g., 318) of a spherical ball. The socket 416 can also have two opposing sidewalls 428*a*, 428*b*, which are part of the two or more shells 424*a*, 424*b*, are separated by a distance 430, and define the one or more slots. For example, the slot of FIG. 4 is defined by the sidewalls 428*a* and 428*b*. In some examples, the socket 416 can include more than one slot. In some such examples, each of the slots can be sized to accommodate a pin. For example, a first slot of the socket can be sized to accommodate a first pin connected to the spherical ball while a second slot of the socket can be sized to accommodate a second pin connected to the spherical ball.

In FIG. 4, the slot has a first end 432, a second end 434, and a central portion 436 therebetween. The central portion 436 has a width 430 which can be slightly larger than a pin such as the pins 318 in FIG. 3. For example, in some embodiments, the width of the slot, including the width of the central portion of the slot, is sufficiently larger (e.g., 0.1-0.5 cm) than a cross-section of the pin (e.g., widest part of the pin) such that the pin can move through the central portion 436 of the slot while being prevented from moving substantially side-to-side when in the slot. In some examples, the width 430 is less than a cross section of a stem (e.g., 306) which can prevent the stem from entering the slot. This can prevent issues whereby the stem is contained by the slot and cannot move in all angular directions. In FIG. 4, the central portion 436 of the slot between the first end 432 and the second end 434 has substantially the same width 430. With the substantially same width, the central portion 436 can accommodate a single pin or multiple pins which have a smaller width than the central portion 436.

While the second end 434 can have the same width as the central portion 436, in some examples, the second end 434 gradually expands until an edge of the socket. For example, in FIG. 4, the sidewalls 428*a*, 428*b* of the slot extend away from each other gradually from the central portion 436 until they define the edges of the opening 426. The gradual increase in space between the sidewalls can help the one or more pins (e.g., 318) of a spherical ball to fit into the slot.

In a similar manner, the first end 432 of the slot can, in some examples, be wider than the central portion 436 of the slot. In some examples, the first end has the same gradual expansion as the second end whereby the sidewalls of the slot at the first end extend away from each other gradually from the central portion width until they define an edge of the opening. In FIG. 4, however, the first end 432 is sized to receive a stem (e.g., 306). The width 438 of the first end 432 of the slot is sized to be larger than the width of the stem used with the socket 416. However, the width 430 of the slot outside of the first end 432 can be less than the cross-section of a stem which can prevent the stem from further entering the slot. By sizing the first end 432 of the slot to be larger than the stem, the stem can be rotated into the first end 432 which, in some examples, can be used as a storage position of the stem. In some examples, the first end 432 is configured to retain the stem when the stem is moved in an angular direction greater than 45 degrees. For example, if the torque transmitting ball joint is used with a hand-guided surface treatment device as in FIG. 1, the stem can be moved greater than 45 degrees relative to the base into the first end. In such a position, the base can extend substantially parallel to the stem. Such a configuration can decrease the footprint of storing the hand-guided surface treatment device and can make carrying the hand-guided surface treatment device easier.

In some examples, the width 438 of the first end 432 of the slot can gradually increase from a width (e.g., 428) sized to accommodate a pin (e.g., 318) to a width (e.g., 438) sized to accommodate a stem (e.g., 306). Such a gradual increase in width can better accommodate a cylindrical stem. In some examples, the portion of the first end 432 proximate the opening of the slot can be sized to be slightly smaller than a stem. In some such examples, the stem and/or the first end can momentarily deflect when pushed together and the stem can be locked into the first end of the slot. In a similar manner, the stem can be unlocked from the first end by pulling the stem apart from the first end which can momentarily deflect the stem and/or the first end. In some examples, the first end 432 of the slot can extend such that at least the entire width of the stem can be received within the first end 432. Alternatively, in some embodiments, the first end 432 of the slot can extend for only a portion of the width of the stem. While only the first end 432 of the slot is shown as able to receive the stem, in some examples, the second end 434 of the slot can receive the stem. Further, in some embodiments which include multiple slots, a portion of each of the slots can be configured to receive the stem. In some such embodiments, the stem can lock in each of the slots configured to receive the stem.

In some embodiments, other locking mechanisms can be used to lock the ball and/or the stem into place relative to the base. In such embodiments, the locking mechanisms can have discrete locking positions such as the stem perpendicular being to the base, the stem being at an angle relative to the base, and the stem being parallel to the base. Additionally or alternatively, the locking mechanisms can be configured to continuously lock the stem at any angle relative to the base including parallel and perpendicular. For instance, in some embodiments, the ball and stem can be locked into place by compressing the socket to frictionally engage the ball and/or stem. In some such embodiments, a user can control when the socket is compressed to lock the ball and stem relative to the base. Thus, a user can control the angle of the stem relative to the base continuously. It can be advantageous to have multiple locking positions, discrete or continuous, to allow a user to control the position of the base relative to the stem. For example, a user can lock the stem with a handle relative to the base for long cleaning portions where constant angled adjustment is not necessary (e.g., reducing user fatigue), for short term storage, for long term storage (e.g., smaller storage footprint), for changing out a cleaning head of the base, and for other reasons a person having ordinary skill in the art will appreciate.

Figure 5:
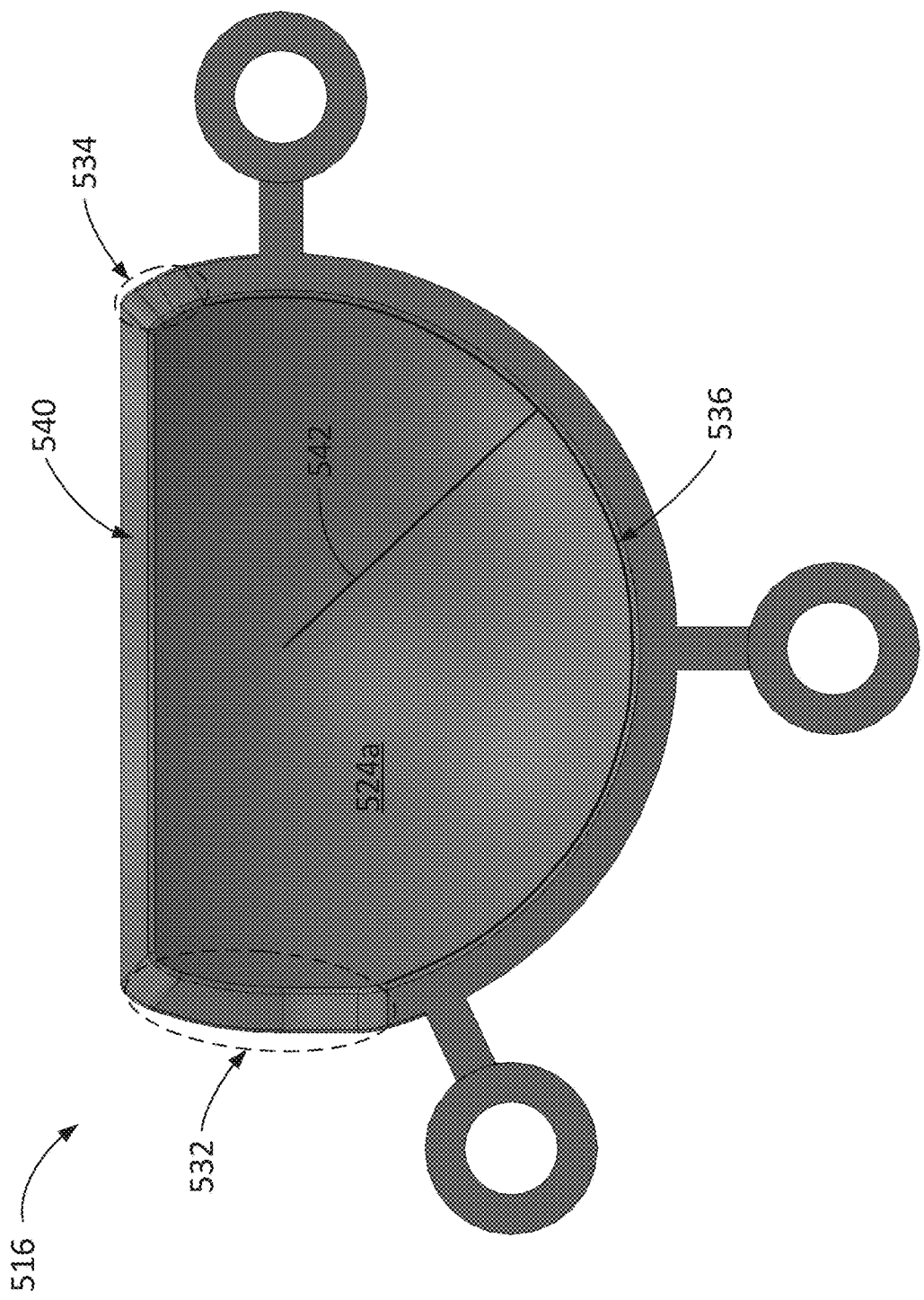
FIG. 5 is a section view of the example socket of FIG. 4 according to an aspect of the present disclosure.

Moving to FIG. 5, FIG. 5 is a section view of the example socket of FIG. 4 according to an aspect of the present disclosure. The section view of the socket 516 is taken along the length of the slot such that only one shell 524a of the two shells is visible. The socket 516 comprises an opening (e.g., 426) which is defined by the shells (e.g., 424a, 424b). As illustrated in FIG. 5, the top of the shell 524a includes an edge 540 which defines the opening and is angled. The top of the second shell can also include a similarly angled edge. In some examples, the top of the shells does not include an angled edge. However, including an angled edge on the top of the shells can allow a stem of the torque transmitting ball joint to be more maneuverable and tilt to a larger degree before hitting the edge of the shell. In some examples, the edges of the socket are rounded or fileted. Rounding the edges can reduce wear and facilitate movement of moving parts such as the stem and spherical ball.

The shell 524a also has a radius of curvature 542. The radius of curvature 542 of the shell 524a is greater than the radius of curvature (e.g., 310) of a spherical ball (e.g., 314). In some examples the radius of curvature of the shell is only slightly greater than the radius of the curvature of the spherical ball. The difference between the two radii of curvature can affect the ability for the spherical ball to rotate within the socket. For example, a larger difference between the radii of curvature can enable the spherical ball to move easily within the socket but may cause the sphere to not be properly retained by the socket. On the other hand, a very small difference between the radii of curvature may prevent the spherical ball from moving within the socket. Thus, the radius of curvature 542 of the shell 524a is sufficiently greater than the radius of curvature of a spherical ball which fits inside the shell 524a such that the spherical ball can rotate within the shell while still being retained.

The socket of FIG. 5 also includes the first end 532, the second end 534, and the central portion 536 of the slot. The central portion 536 extends between the first end 532 and the second end 534. The first end 532 of the slot is larger than the second end 534 of the slot and can be sized to fit a stem. In such examples, the second end 534 of the slot can be sized such that it cannot fit the stem. However, the entire slot, including the second end 534, can be sized to fit one or more pins of a spherical ball. For example, one or more pins of a spherical ball can move anywhere along the slot from the first end 532, the central portion 536, and the second end 534.

Figure 6:
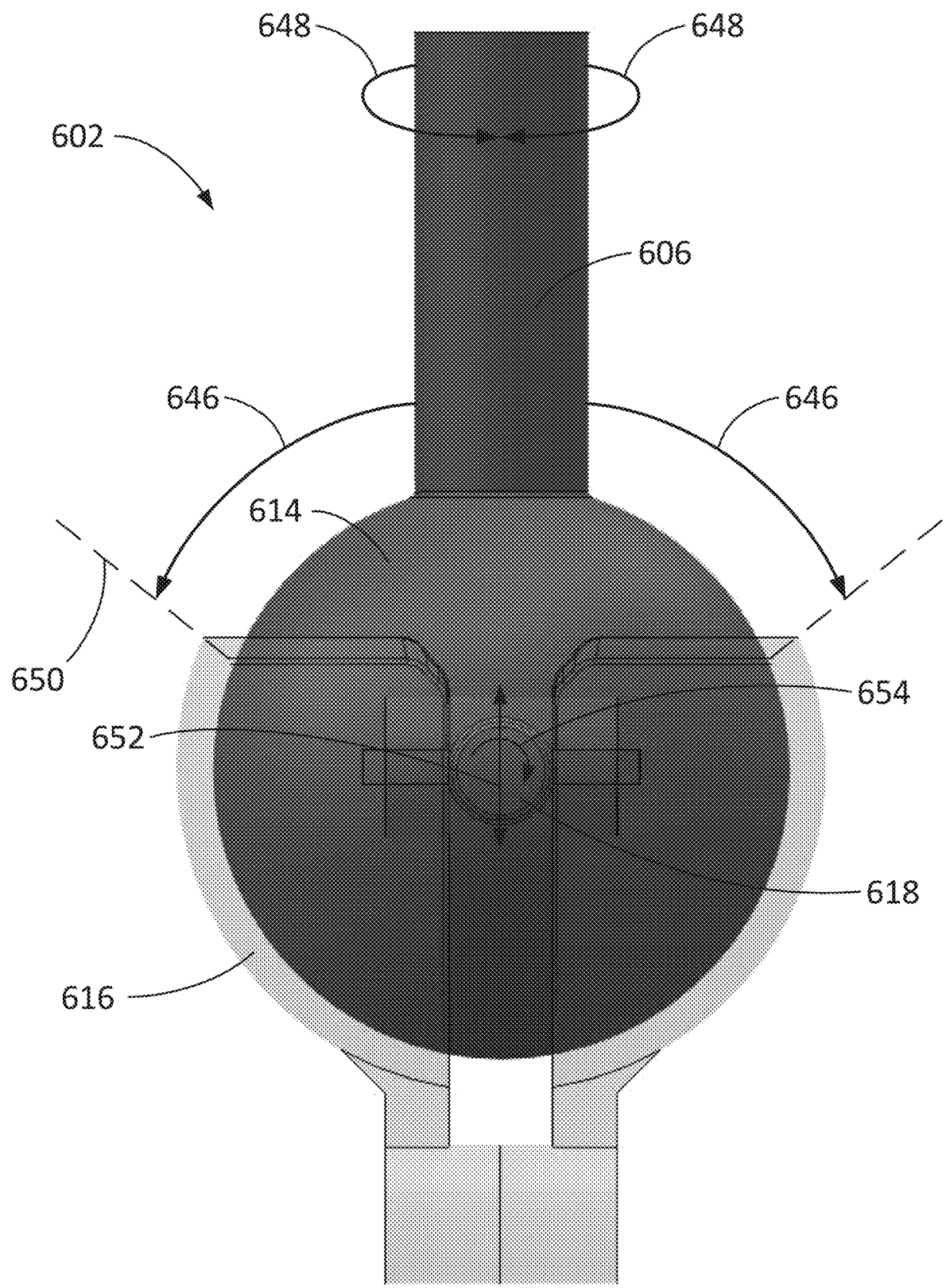
FIG. 6 is a is a side view of an example torque transmitting ball joint with a transparent socket showing possible movement according to an aspect of the present disclosure.

Moving to FIG. 6, FIG. 6 is a is a side view of an example torque transmitting ball joint with a transparent socket showing available movement according to an aspect of the present disclosure. The torque transmitting ball joint 602 includes a spherical ball 614 connected to a stem 606 and connected to a pin 618. The spherical ball 614 is contained by a socket 616 and the pin 618 of the ball are contained by a slot defined by the socket. As illustrated by arrows 646, the stem 606 can move laterally when the pin 618 is in the slot. The stem 606 can move laterally until the stem 606 hits the edge of the socket 616. In some examples, the edge of the socket 616 is angled. For example, in FIG. 6, edge of the socket is angled at approximately 45 degrees from vertical. The angling of the edge of the socket 616 can allow the edge of the socket to make contact along a length of the stem which can reduce wear on the socket and/or stem when compared to an edge which is at 0 degrees from vertical or 90 degrees from vertical.

As the stem moves laterally the spherical ball 614 rotates within the socket about its center. The one or more connected pins 618 can rotate with the spherical ball 614 as illustrated by the arrow 654. Because the spherical ball 614 is constrained by the socket, and the pin 618 are constrained in the one or more slots of the socket, the lateral movement shown of the stem 606 (e.g., 646) does not cause the pin 618 to move, only to rotate. For example, if the stem 606 moves leftward, the pin 618 rotates counterclockwise while if the stem 606 moves rightward, the pin 618 rotates clockwise. However, the stem 606 is not limited to only lateral movements. In some examples, the stem 606 can move forward and backward (e.g., in to and out of the page). In some such examples, the spherical ball 614 can rotate about its center and the pin 618 connected to the ball can move vertically within the slot as shown by arrows 652. In some examples, the pin 618 can move such that it is no longer constrained by the slot of the socket 616 (e.g., as in FIG. 2). In some embodiments, the pin 618 can move such that it contacts an end of the slot. In the embodiment of FIG. 6, the stem 606 can move both laterally and forward or backward. In such embodiments, the spherical ball 614 can rotate about its center and the pin 618 can rotate and move vertically simultaneously.

Continuing with FIG. 6, the stem 606 can be rotated (e.g., twisted) about its center axis as shown by arrows 648. When the stem 606 is rotated about its axis, the connected spherical ball 614 will attempt to rotate about its center in a similar manner. However, the pin 618, which is connected to the ball, is constrained within the slot of the socket 616 and cannot move much if at all before it contacts a sidewall of the socket. Thus, when the stem 606 rotates, the pin 618 connected to the spherical ball 614 pushes against a sidewall of the socket 616 which can cause the socket 616 to rotate in the same direction as the stem. By twisting and providing torque to the stem 606, the torque is transferred from the stem 606 to the socket 616 through the spherical ball 614 and the pin 618.

As described with respect to FIG. 6, the stem 606 can move forward and backward which can cause the pin 618 to move out of the slot of the socket 616. When the pin 618 is not in the slot of the socket 616, the pin 618 does not contact sidewalls of the socket and cannot transmit torque from the stem 606 to the socket 616. However, in some examples, as the pin 618 moves out of the slot of the socket 616, a pin connected to the other side of the spherical ball 614 moves into a slot of the socket 616. As is described elsewhere herein, this configuration can allow the pin on the other side of the spherical ball 614 to transmit torque from the stem to the socket 616.

Figure 7:
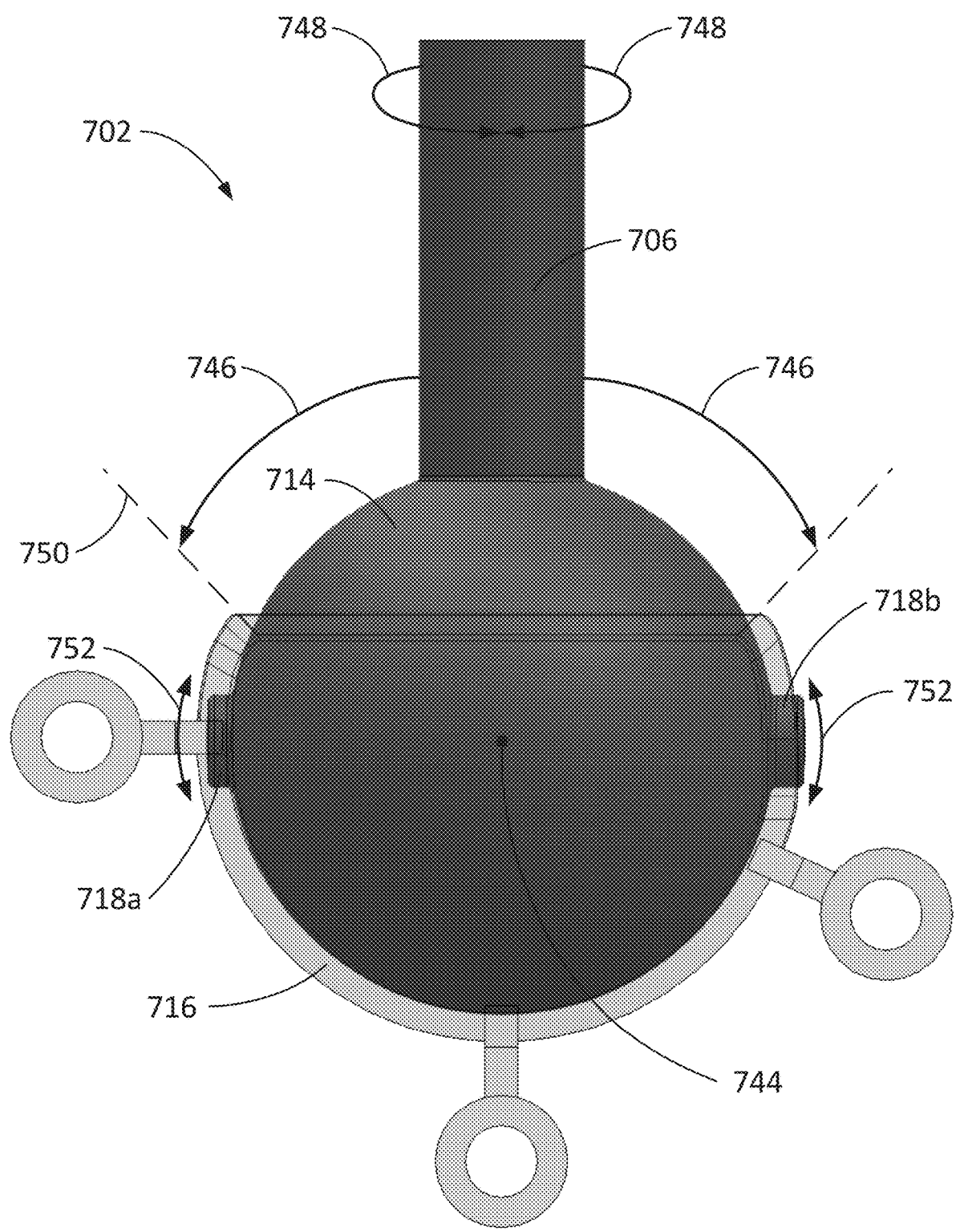
FIG. 7 is a front view of the example torque transmitting ball joint of FIG. 6 with a transparent socket showing possible movement according to an aspect of the present disclosure.

Moving to FIG. 7, FIG. 7 is a front view of the example torque transmitting ball joint of FIG. 6 with a transparent socket showing possible movement according to an aspect of the present disclosure. The torque transmitting ball joint 702 includes a stem 706 connected to a ball 714 and pins 718a, 718b. As illustrated by arrows 746, the stem 706 can move laterally until it contacts an edge of the socket 716. The edge of the socket 716 is angled at 45 degrees from vertical and the lines 750 shows the extent to which the stem 706 can move until it contacts an edge of the socket 716. When the stem 706 moves laterally, the spherical ball 714 rotates about its center and the pints 718a, 718b connected to the spherical ball 714 move within the slot of the socket 716 as shown by arrows 752. For example, when the stem 706 moves leftward, the pin 718a can move downward (e.g., rotate counter-clockwise) while the pin 718b moves upward (e.g., rotates counter-clockwise). Similarly, when the stem 706 moves rightward, the pin 718a can move upward (e.g., rotate clockwise) while the pin 718b moves downward (e.g., rotates clockwise). As illustrated in FIG. 7, the pins 718a, 718b are connected to the spherical ball 714 at 180 degrees apart from each other on diametrically opposite sides of the spherical ball 714. In some embodiments, the pins are connected to the ball at an angle other than 180 degrees relative to each other.

Continuing with FIG. 7, the stem 706 can rotate (e.g., twist) about its axis as shown by arrows 748. When the stem 706 is rotated about its axis the connected spherical ball 714 will attempt to rotate about its center in a similar manner. However, one of the pins 718a, 718b connected to the spherical ball 714 is always in a slot of the socket 716. Such a pin can contact the socket 716 and cause the socket 716 to rotate in the same direction as the stem 706. In this way, torque applied to the stem 706 is transferred to the socket 716.

In some examples, the center of the torque transmitting ball joint 702 is considered a pivot center 744. In some examples, the pivot center 744 can be the point about which the spherical ball 714, the pins 718a, 718b, and the stem 706 rotate. For example, the stem 706 can move laterally leftward and rightward relative to the socket 716 as shown by arrows 746, but the stem 706 and the spherical ball 714 it is attached to, are also rotating about the pivot center 744. Similarly, while the pins 718a, 718b can translate relative to the socket 716 as shown by arrows 752, the pins 718a, 718b are also rotating about the pivot center 744. Thus, in some examples, the stem, spherical ball, and pins can rotate relative to the socket about a pivot center.

Figure 8:
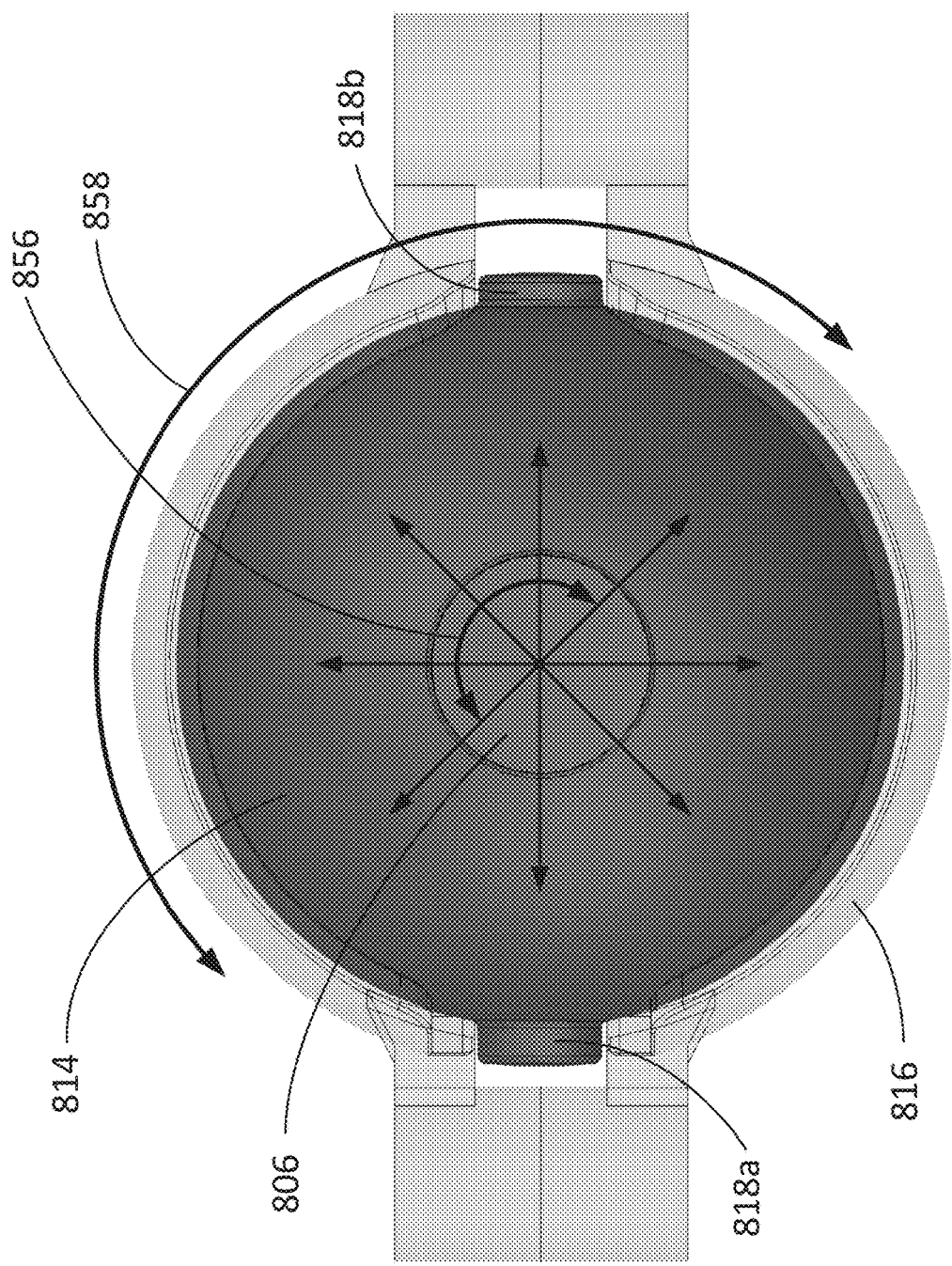
FIG. 8 is a top-down view of the example torque transmitting ball joint of FIG. 6 and FIG. 7 with a transparent socket showing possible movement according to an aspect of the present disclosure.

FIG. 8 is a top-down view of the example torque transmitting ball joint of FIG. 6 and FIG. 7 according to an aspect of the present disclosure. As illustrated by the arrows emanating from the center of the stem 806 in FIG. 8, the stem 806 can move in all angular directions until the stem 806 contacts an edge of the socket 816. In some examples, the stem 806 can move in all angular directions up to 45 degrees from center before the stem contacts the edge of the socket. When the stem 806 moves in a specific angular direction, the connected spherical ball 814 rotates about its center and the pins 818a, 818b can translate and/or rotate into or out of a slot within the socket 816. Further, as illustrated by arrows 856 and 858, the stem 806 can rotate about its axis which can cause the entire socket 816 to rotate in the same direction about its axis. For example, if the stem is rotated clockwise about its axis, the socket will also rotate clockwise about its access. In some embodiments, the degree of rotation the stem rotates is equivalent to the degree of rotation the socket rotates.

Figure 9:
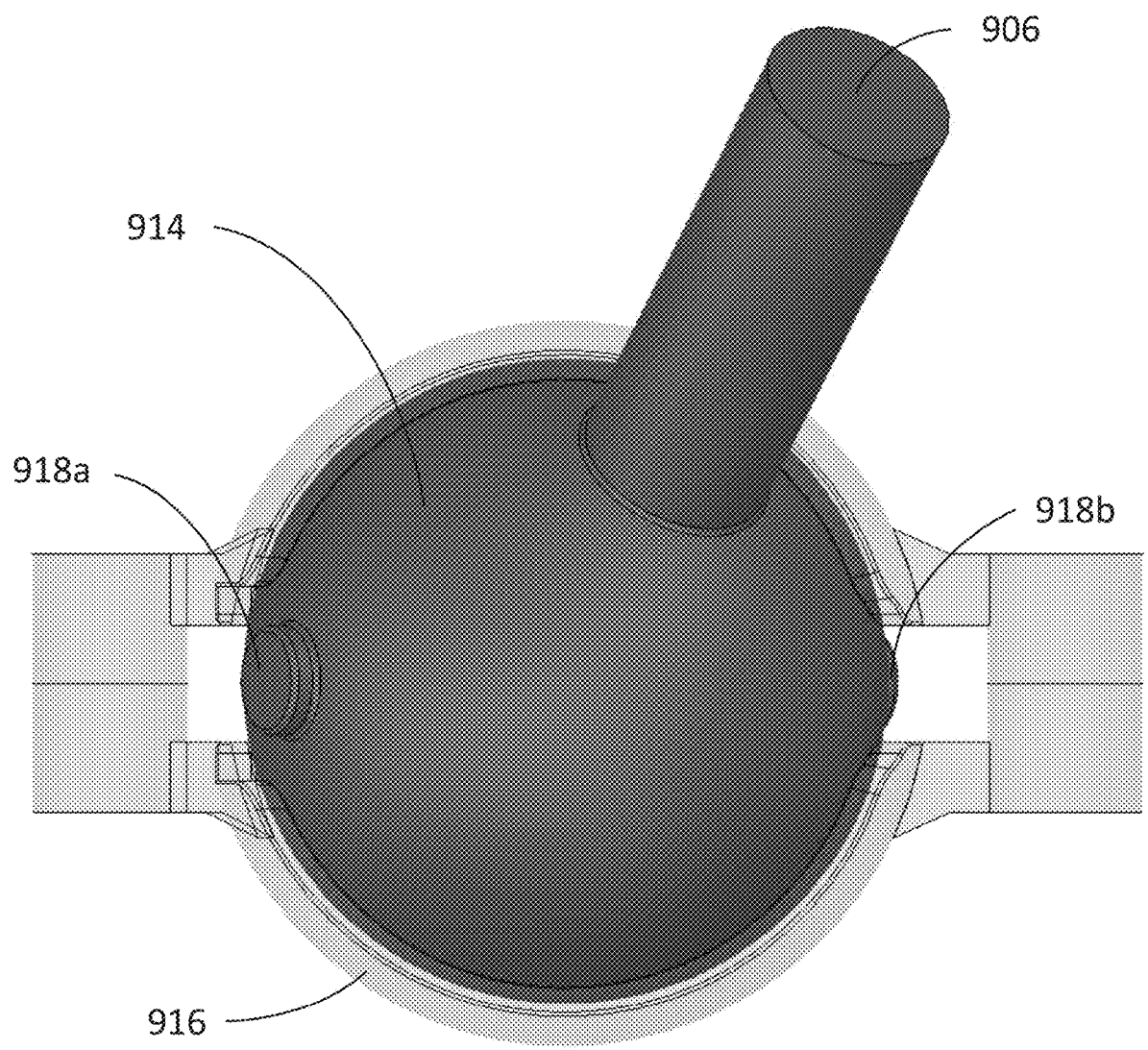
FIG. 9 is the example torque transmitting ball joint of FIGS. 6-8 with the stem having been moved relative to the socket according to an aspect of the present disclosure.

FIG. 9 is the example torque transmitting ball joint of FIGS. 6-8 with the stem having been moved relative to the socket according to an aspect of the present disclosure. The stem 906 in FIG. 9 has been moved relative to the socket in an upward and rightward direction, as viewed from the top-down view, to a point at which it contacts the edge of the socket 916. As can be seen by comparing FIGS. 6-8 to FIG. 9, the pin 918a has moved relative to the socket 916. Specifically, the pin 918a has rotated about the ball's 914 center and translated from its original position to a point outside of its slot where it is not contained by said slot. However, the pin 918b has also translated and rotated in a similar manner to the pin 918a and is contained within the slot. With the configuration of the slot of the socket 916 and the location of the pins 918a, 918b on the spherical ball 914, when one pin moves outside of the slot, the other pin moves into the slot. Thus, in some embodiments, one of the pins is always contained by the slot. In some embodiments comprising more than one slot, one of the pins is always contained by its respective slot. As described elsewhere herein, the pin which is contained by a slot of the socket can contact a sidewall of the socket and transmit torque from the stem to the socket.

Figure 10:
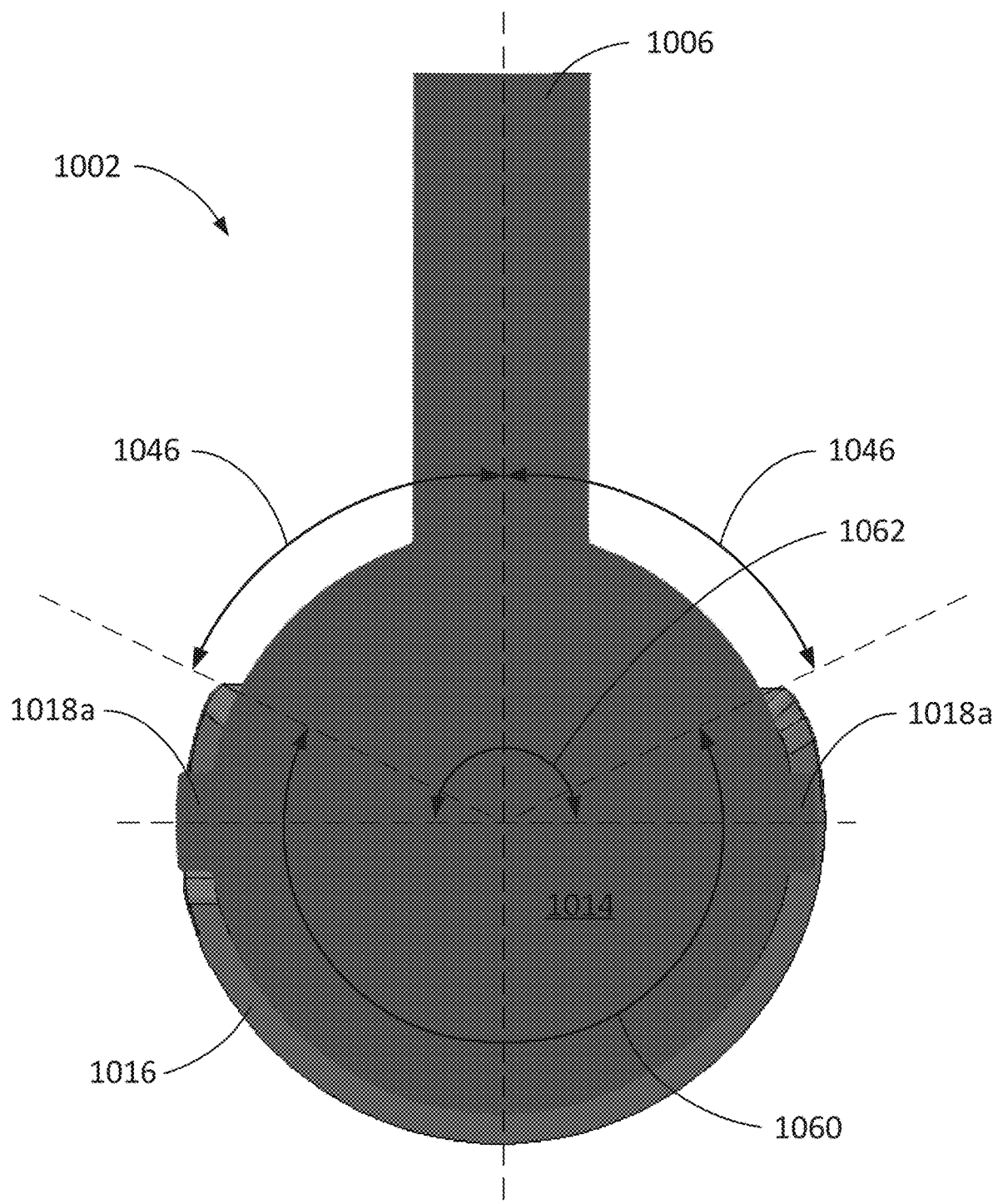
FIG. 10 is a side section view of a torque transmitting ball joint according to an aspect of the present disclosure.

Moving to FIG. 10, FIG. 10 is a side section view of a torque transmitting ball joint according to an aspect of the present disclosure. The torque transmitting ball joint 1002 includes a stem 1006 and two pins 1018a, 1018b connected to a spherical ball 1014. The spherical ball 1014 is contained within a socket 1016. As discussed elsewhere herein, the stem 1006 can move relative to the socket 1016 in any angular direction. As illustrated in FIG. 10 by the arrows 1046, the stem can move rightward and leftward from vertical. In some embodiments, the stem can move up to 45 degrees from vertical in any direction (e.g., leftward and rightward). Alternatively, in some embodiments, the stem can move 45 degrees or more from vertical in any direction. In some examples, the angle of the opening of the socket 1016 can determine the maximum angle the stem 1006 can move from vertical in any direction. For example, in FIG. 10, the angle of the opening of the socket 1016 is approximately 45 degrees from vertical, thereby allowing the stem 1006 to move up to 45 degrees from vertical before contacting the edge of the socket 1016.

In FIG. 10, the angle 1060 represents the angle at which the socket extends to contain the spherical ball 1014. In some embodiments, the angle 1060 has a minimum value before the spherical ball 1014 is no longer able to be contained by the socket 1016. For example, in some embodiments, the angle 1060, and thus the socket 1016, must be greater than 180 degrees. However, in some examples, the angle 1060 can also have a maximum value. The maximum value can represent the furthest the socket 1016 can extend without unduly limiting the range of movement of the stem 1006 relative to the socket 1016. For example, in some embodiments, the angle 1060 can have a maximum value of 300 degrees.

Continuing with FIG. 10, the pins 1018a and 1018b are on diametrically opposing sides of the spherical ball 1014 at an angle 1062 which is 180 degrees relative to each other. In some examples, though, the pins 1018*a* and 1018*b* can be connected to the spherical ball 1014 at an angle other than 180 degrees apart from each other. For example, in some embodiments, the pins can be connected to the spherical ball at an angle greater than 180 degrees relative to each other. Alternatively, in some embodiments, the pins can be connected to the spherical ball at an angle less than 180 degrees relative to each other. It can be desirable to connect the pins to the spherical ball at around 180 degrees relative to each other in order keep only one of the pins in a slot at a time. If, for example, two pins connected to the spherical ball are in a slot at the same time, the stem may not be able to move in all angular directions and/or seize up. However, the extent of the socket and the associated one or more slots for containing the two pins can be adjusted such that the angle of one pin relative to the other pin can be greater or less than 180 degrees. For example, the extent of the socket can have an angle 1060 which is less than 270 degrees and the corresponding angle 1062 of the pins can be greater than 180 degrees. To maintain the maneuverability of the stem with respect to the socket and to keep the ball retained in the socket, though, the angle 1060 should be greater than the angle 1062.

Figure 11:
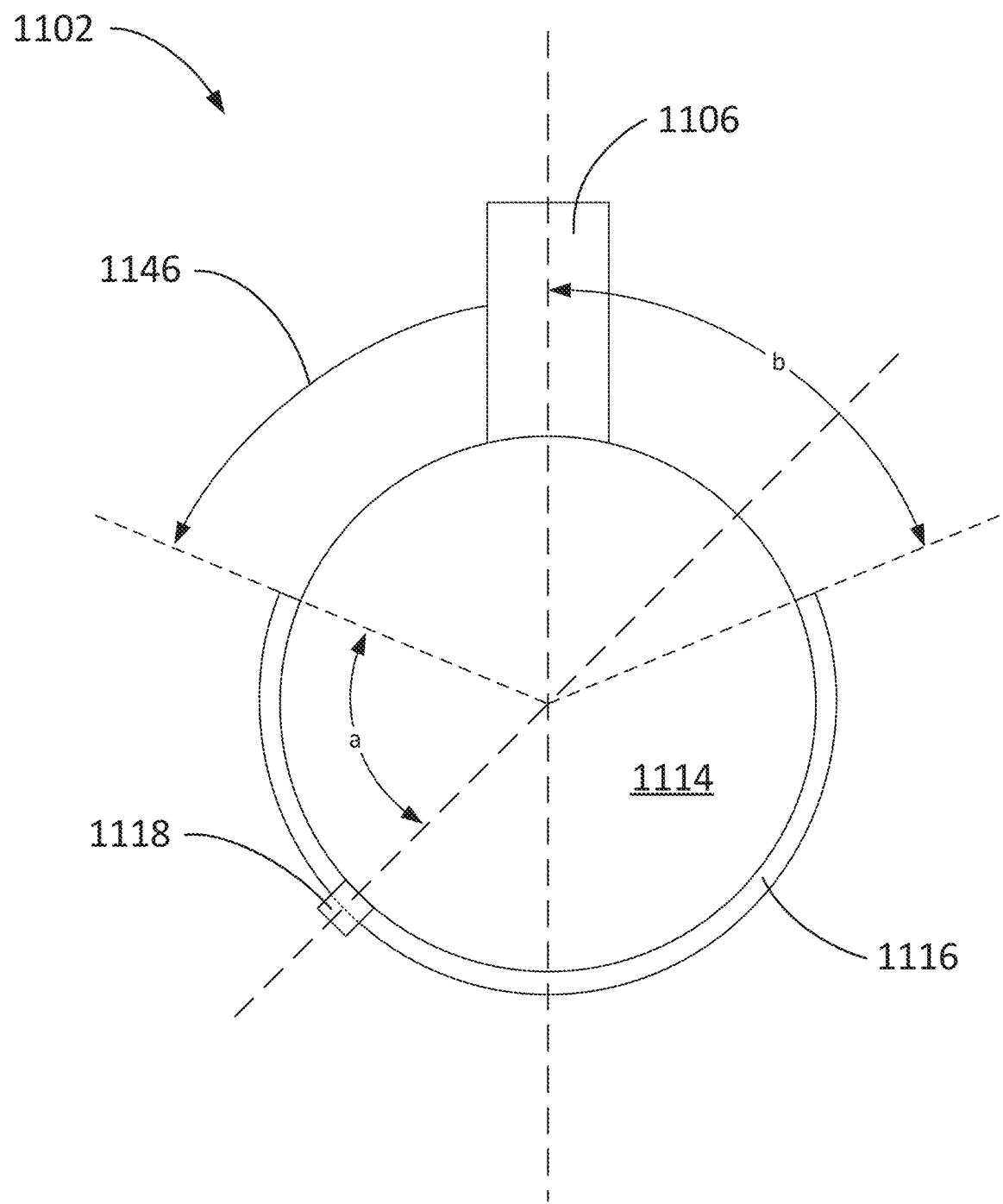
FIG. 11 is an alternate example of a torque transmitting ball joint which includes a single pin according to an aspect of the present disclosure.

Moving to FIG. 11, FIG. 11 is an alternate example of a torque transmitting ball joint which includes a single pin according to an aspect of the present disclosure. The torque transmitting ball joint 1102 includes a stem 1106 and a pin 1118 connected to a spherical ball 1114. The spherical ball 1114 is contained within a socket 1116 which can include one or more slots which can receive the pin 1118. As described with respect to the two pin embodiments, the pin 1118 can be contained in the slot of the socket and can translate and rotate as the stem 1106 moves in various angular directions. Further, the pin 1118 and can contact a sidewall of the socket 1116 when the stem 1106 is rotated (e.g., twisted) about its axis which can cause the socket 1116 to rotate, thereby transmitting torque from the stem 1106 to the socket 1116. However, in some embodiments, the pin must be contained within the one or more slots to transmit torque. If, for example, the pin translates out of a slot, rotating the stem about its center axis would cause the ball and connected pin to rotate about the ball's center, but the pin would not contact a sidewall and would spin without transmitting torque to the socket.

As illustrated in FIG. 11, the pin 1118 connects to the spherical ball 1114 at a position relative to the center axis of the stem 1106 when the stem is aligned with the vertical axis. The position of the pin on the spherical ball 1114 can be defined by an angle "a" which is the angle between the position of the pin relative to an edge of the socket 1116 when the stem 1106 is aligned with the vertical axis. As described elsewhere herein, the edge of the socket continues about the torque transmitting ball joint and defines an opening which enables the stem to move in any angular direction. In FIG. 11, the amount the stem can move can be defined by the angle "b" between the stem 1106 when it is aligned with the vertical axis and the edge of the socket 1116. As the stem 1106 is connected to the spherical ball 1114 and the pin 1118 is also connected to the spherical ball 1114, movement of the stem causes movement of the pin 1118. In some embodiments, to prevent the pin 1118 from moving out of the slot in which it is contained and ensuring torque is transmitted between the stem 1106 and the socket 1116, the angle "a" must be greater than the angle "b". For example, if angle "b" is 45 degrees, the stem can move up to 45 degrees in any angular direction. In such an example, angle "a" must be greater than 45 degrees so that the pin 1118 does not move out of its socket. The same relationship should be kept if the pin 1118 is located on the other side of the centerline.

Figure 12:
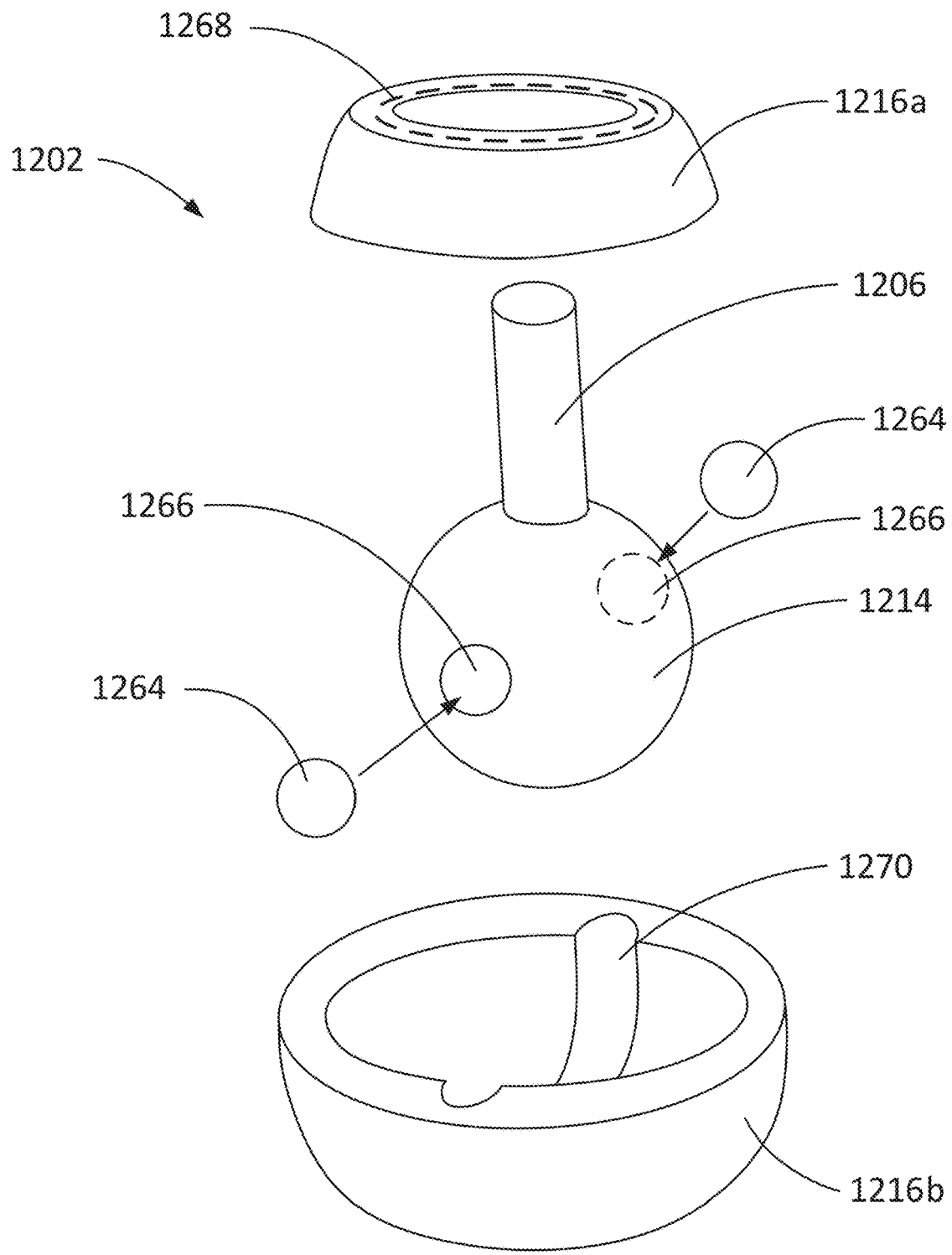
FIG. 12 is a is an alternate example of a torque transmitting ball joint which includes bearings instead of pins according to an aspect of the present disclosure.

Moving to FIG. 12, FIG. 12 is a is an alternate example of a torque transmitting ball joint which includes bearings instead of pins according to an aspect of the present disclosure. In some examples, the bearings comprise ball bearings. The torque transmitting ball joint 1202 includes a stem 1206 which is connected to a spherical ball 1214. The spherical ball 1214 includes detents 1266 which are sized to contain bearings 1264 and can be spherically shaped. The torque transmitting ball joint 1202 further includes a socket which can be made from a top portion 1216*a* and a bottom portion 1216*b* which can be secured together. The socket is sized to contain the spherical ball 1214 within the top portion 1216*a* and the bottom portion 1216*b* when the top portion and bottom portion are secured together. The top portion 1216*a* of the socket includes an opening 1268 which is larger than the stem 1206 and can allow the stem to move until it contacts an edge of the top portion 1216*a* of the socket. The bottom portion 1216*b* of the socket includes a channel 1270 which is sized to accept the bearings 1264. In some examples, the channel 1270 is shaped in a half cylinder which follows the curve of the socket. In some examples, the top portion of the socket also includes a portion of the channel. The bearings 1264 are not connected to anything in the torque transmitting ball joint 1202 and can be loosely contained by the detents 1266 and the channel 1270. In some examples, the size (e.g., diameter) of the bearings 1264 can be slightly smaller than the size (e.g., diameter) of the detents 1266 and the channel 1270. By having a slightly smaller size, the bearings 1264 can more easily fit within the detents 1266 and the channel 1270 and the bearings can rotate about their centers (e.g., roll) more easily. However, the sizes of the bearings 1264, the detents 1266, and the channel 1270 can be complementary to enable the spherical ball 1214 to rotate about its axis without contacting the socket in which it is contained. For example, in some embodiments, a bearing, when placed in the space created by a detent of a spherical ball and a channel of a socket, can be sized large enough such that the spherical ball does not contact the socket. In some such embodiments, a space is created between the entire spherical ball and the socket with the space enabling the spherical ball 1214 to rotate within the socket.

For operation of the torque transmitting ball joint 1202 of FIG. 12, the top portion 1216*a* of the socket is secured to the bottom portion 1216*b* of the socket with the spherical ball 1214 inside. Additionally, the bearings 1264 are located within the detents 1266 and within the channel 1270 such that a portion of each bearing 1264 is in the detents 1266 and the channel 1270. The bearings 1264 are thereby retained between the spherical ball 1214 and the socket. In operation, the stem 1206 can move in any angular direction (e.g., 360 degrees around) up until the stem hits the edge of the top portion 1216*a* of the socket which defines the opening 1268. As the stem 1206 moves, the spherical ball 1214 which it is attached to rotates about its center. As the spherical ball 1214 rotates about its center, the detents 1266 also rotate about the center. The rotation of the detents 1266 can then cause the bearings 1264 to rotate about their center (e.g., roll) while in the detents and to roll along the channel 1270. For example, if the stem 1206 moves in the same direction as the extent of the channel 1270, the bearings 1064 will roll along the channel 1270 as the spherical ball 1214 rotates about its center. If, however, the stem 1206 moves in a direction perpendicular to the channel 1270, the bearings 1264 can rotate about their center without moving along the channel 1270. In examples in which the stem moves neither parallel nor perpendicular to the channel 1270, the bearings 1264 can roll along a portion of the channel 1270 while also rotating about their centers and within their detents. The use of bearings 1264 with the corresponding detents 1266 and the channel 1270 can enable the stem to move in any angular direction.

In further operation, rotating (e.g., twisting) the stem 1206 about its center axis can cause the spherical ball 1214 to rotate in the same direction. The rotation of the spherical ball 1214 can then cause the bearings 1264, which are retained in part by the detents 1266 of the spherical ball 1214, to contact an edge of the detents 1266 and/or the edge of the channel 1270. While the bearings 1264 may rotate about their center, their contact with the edge of the detents 1266 and/or the edge of the channel 1270 can cause the socket to also rotate about its center in the same direction as the rotation of the stem 1206. In this manner, torque provided to the stem 1206 can be transmitted to the socket using the bearings 1264 contained within the detents 1266 of the spherical ball 1214 and within the channel 1270 of the socket. A person of ordinary skill will appreciate that the torque transmitting ball joint 1202 of FIG. 12 can work in a reverse manner whereby torque provided to the socket can be transmitted to the stem 1206.

Various examples have been described. These and other examples are within the scope of the following claims.

The invention claimed is:

1. A torque transmitting ball joint comprising:
a spherical ball;
a stem extending from the spherical ball;
one or more pins coupled to the spherical ball; and
a socket comprising an opening sized to contain the spherical ball within the socket and one or more slots sized to accommodate a respective pin of the one or more pins, each of the one or more slots having opposing first and second ends adjacent a periphery of the opening, the first end of the slot being sized to receive the stem at an angle greater than 45 degrees relative to a center position within the opening, at least one of the one or more pins being contained within a respective slot and translating relative to the respective slot as the stem and the spherical ball rotate relative to the socket about a pivot center, the at least one of the one or more pins abutting a sidewall of the respective slot and transmitting torque from the stem and the spherical ball to the socket when the stem and the spherical ball rotate relative to the socket.

2. The ball joint of claim 1, wherein the opening of the socket is configured to permit the stem to pivot about the pivot center in all angular directions until the stem contacts an edge of the socket.

3. The ball joint of claim 2, wherein the stem can move at least 45° in all angular directions before the stem contacts the edge of the socket.

4. The hall joint of claim 2, wherein the at least one of the one or more pins remain contained within the respective slot during movement of the stem to all the angular directions and during the resulting translation of the at least one of the one or more pins relative to the respective slots as the stem and the socket rotate relative to each other.

5. The ball joint of claim 1, wherein the one or more pins comprise two pins, the two pins being positioned on diametrically opposite sides of the spherical ball.

6. The ball joint of claim 5, wherein at least one of the two pins remains contained within a respective slot when the stem moves relative to the socket.

7. The ball joint of claim 1, wherein the one or more slots comprise two opposing sidewalls of the socket, the two opposing sidewalls separated by a width, the width being less than 0.5 cm larger than a cross-section of the pin.

8. The ball joint of claim 7, wherein the stem has a cross section greater than the width such that the stem cannot enter the one or more slots.

9. The ball joint of claim 1, wherein an end of the one or more slots is sized to receive the stem, the end located proximate the opening.

10. The ball joint of claim 9, wherein the end of the one or more slots is configured to retain the stem when the stem is moved in an angular direction greater than 45'.

11. The ball joint of claim 1, wherein the socket comprises two or more shells coupled to each other to retain the spherical ball.

12. The ball joint of claim 11, wherein the one or more slots are defined via spaces between the two or more shells.

13. The ball joint of claim 11, wherein the two or more shells are diametrically opposed about the spherical ball.

14. The ball joint of claim 1, wherein the socket encompasses sufficient outer surface of the spherical ball to retain the spherical ball in the socket.

15. A hand-guided surface treatment device comprising the ball joint of claim 1, further comprising:
a base configured to rest upon a surface, the base comprising one or more surface maintenance tools; and
a guide handle configured for manually manipulating the base; wherein
the base is coupled to a first of the stem or the socket and the guide handle is coupled to a second of the stem or the socket, the coupling enabling the guide handle to continuously transmit torque to the base.

16. A torque transmitting ball joint comprising:
a spherical ball;
a stem coupled to the spherical ball;
a pin coupled to the spherical ball; and
a socket sized to retain the spherical ball comprising an opening, the stem and a portion of the spherical ball extending outside of the socket, the socket comprising a slot sized to accommodate the pin, each of the one or more slots having opposing first and second ends adjacent a periphery of the opening, the first end of the slot being sized to receive the stem at an angle greater than 45 degrees relative to a center position within the opening, the pin being contained within the slot and sliding relative to the slot as the stem and the spherical ball rotate relative to the socket about a pivot center, the pin abutting a sidewall of the respective slot and transmitting torque from the stem and the spherical ball to the socket when the stem and the spherical ball rotate relative to the socket.

17. A torque transmitting ball joint comprising:
a spherical ball comprising two or more detents, the two or more detents sized to contain two or more bearings;
a stem extending from the spherical ball; and
a socket comprising an opening sized to contain the spherical ball within the socket and one or more channels sized to contain the two or more bearings within the socket, each of the one or more channels having opposing first and second ends adjacent a periphery of the opening, the first end of the slot being sized to receive the stem at an angle greater than 45 degrees relative to a center position within the opening, the two or more bearings translating relative to the one or more channels as the stem and the spherical ball rotate relative to the socket about a pivot center, the two or more bearings abutting a sidewall of the one or more channels and transmitting torque from the stem and the spherical ball to the socket when the stem and the spherical ball rotate relative to the socket.

18. The ball joint of claim 17, wherein the opening of the socket is configured to permit the stem to pivot about the pivot center in all angular directions until the stem contacts an edge of the opening.

19. The ball joint of claim 17, wherein the socket comprises a top portion and a bottom portion, the top portion comprising the opening sized to contain the spherical ball, the bottom portion comprising a portion of the one or more channels.

20. The ball joint of claim 19, wherein the top portion further comprises a portion of the one or more channels.

\* \* \* \* \*